(12) United States Patent
Benedict et al.

(10) Patent No.: US 10,572,368 B2
(45) Date of Patent: Feb. 25, 2020

(54) APPLICATION MANAGEMENT BASED ON DATA CORRELATIONS

(71) Applicant: HEWLETT PACKARD ENTERPRISE DEVELOPMENT LP, Houston, TX (US)

(72) Inventors: Elad Benedict, Yehud (IL); Ohad Assulin, Yehud (IL); Efrat Egozi Levi, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 286 days.

(21) Appl. No.: 15/523,527

(22) PCT Filed: Nov. 24, 2014

(86) PCT No.: PCT/US2014/067067
§ 371 (c)(1),
(2) Date: May 1, 2017

(87) PCT Pub. No.: WO2016/085443
PCT Pub. Date: Jun. 2, 2016

(65) Prior Publication Data
US 2017/0315900 A1    Nov. 2, 2017

(51) Int. Cl.
  *G06F 11/36*   (2006.01)
  *G06F 11/263*  (2006.01)
  (Continued)

(52) U.S. Cl.
  CPC ........ *G06F 11/3612* (2013.01); *G06F 11/263* (2013.01); *G06F 11/302* (2013.01);
  (Continued)

(58) Field of Classification Search
  CPC .. G06F 11/263; G06F 11/3003; G06F 11/302; G06F 11/3414; G06F 11/3433;
  (Continued)

(56) References Cited

U.S. PATENT DOCUMENTS 4,660,151 A * 4/1987 Chipman ............. G01N 21/274
                                                           356/326
6,067,412 A   5/2000 Blake et al.
(Continued)

FOREIGN PATENT DOCUMENTS

WO    WO-2006002071 A2    1/2006

OTHER PUBLICATIONS

Abdi, H. et al., "Principal component analysis," Overview, V.2, Jul./Aug. 2010, 27 pages, available at http://www.wiley.com/wires/compstats.
(Continued)

*Primary Examiner* — S. Sough
*Assistant Examiner* — Stephen D Berman

(57) ABSTRACT

Application management based on data correlations is disclosed. One example is a system including a data processor, a data element generator, a matrix generator, a data analysis module, a performance module, and a load test manager. The data processor accesses test data based on an application under load testing. The data element generator generates a plurality of transactional data elements based on the test data, each data element comprising at least three data components. The matrix generator generates a covariance matrix based on the data components. The data analysis module determines an eigenvector associated with the covariance matrix, and identifies a correlation between a sub-plurality of the at least three data components based on coefficients of the eigenvector. The performance module determines, based on the correlation, performance metrics for the application under load testing. The load test manager manages, based on the performance metrics, the application under load testing.

18 Claims, 5 Drawing Sheets

(51) Int. Cl.
*G06F 11/34* (2006.01)
*G06F 11/30* (2006.01)

(52) U.S. Cl.
CPC ...... *G06F 11/3003* (2013.01); *G06F 11/3414* (2013.01); *G06F 11/3433* (2013.01); *G06F 11/3452* (2013.01); *G06F 2201/865* (2013.01); *G06F 2201/87* (2013.01); *G06F 2201/875* (2013.01)

(58) Field of Classification Search
CPC ............ G06F 11/3452; G06F 11/3612; G06F 2201/865; G06F 2201/87; G06F 2201/875
See application file for complete search history.

(56) References Cited

U.S. PATENT DOCUMENTS

| | | | |
|---|---|---|---|
| 6,826,575 B1* | 11/2004 | Waclawski | G06F 11/3442 |
| 7,198,964 B1 | 4/2007 | Cherry et al. | |
| 7,720,955 B1 | 5/2010 | Kelly et al. | |
| 8,098,714 B2 | 1/2012 | Mourad | |
| 8,150,195 B2 | 4/2012 | Demirci et al. | |
| 8,494,095 B2 | 7/2013 | Cho et al. | |
| 8,509,570 B2 | 8/2013 | Degani et al. | |
| 8,762,302 B1 | 6/2014 | Spivack et al. | |
| 2003/0079160 A1* | 4/2003 | McGee | G06F 11/0709 714/39 |
| 2003/0110007 A1* | 6/2003 | McGee | G06F 11/0709 702/179 |
| 2005/0120273 A1* | 6/2005 | Hudson | G06F 11/0748 714/38.11 |
| 2005/0278703 A1* | 12/2005 | Lo | G06F 11/0709 717/126 |
| 2006/0074290 A1* | 4/2006 | Chen | G06T 7/0012 600/407 |
| 2008/0133435 A1* | 6/2008 | Chintalapti | G06F 11/3409 706/12 |
| 2009/0060266 A1* | 3/2009 | Sornborger | G01N 21/6408 382/100 |
| 2011/0041122 A1* | 2/2011 | Bondi | G06F 11/3433 717/128 |
| 2012/0017165 A1* | 1/2012 | Gardner | G06F 16/957 715/771 |
| 2012/0089868 A1* | 4/2012 | Meijer | G06F 11/076 714/26 |
| 2013/0024843 A1 | 1/2013 | Kutlu | |
| 2013/0173042 A1 | 7/2013 | Morisawa et al. | |
| 2013/0318607 A1* | 11/2013 | Reed | G06F 11/3062 726/23 |
| 2014/0108324 A1* | 4/2014 | Chen | G06F 17/18 706/52 |
| 2014/0108359 A1* | 4/2014 | Banaei-Kashani | G06F 11/0745 707/692 |
| 2014/0180597 A1* | 6/2014 | Brown | A61B 5/04012 702/19 |
| 2014/0258352 A1 | 9/2014 | Miles et al. | |
| 2015/0019554 A1* | 1/2015 | Hall | G06F 16/285 707/737 |
| 2015/0169393 A1* | 6/2015 | Shibuya | G06F 11/00 702/182 |
| 2015/0220681 A1* | 8/2015 | Dixit | G06F 17/10 703/1 |
| 2015/0227446 A1* | 8/2015 | Horikawa | G06F 11/079 714/37 |

OTHER PUBLICATIONS

International Search Report & Written Opinion received in PCT Application No. PCT/US2014/067067, dated Jul. 6, 2015, 7 pages.
Perez-Riverol, Y., "Introduction to Feature selection for bioinformaticians using R, correlation matrix filters, PCA & backward selection," R-Bloggers, Oct. 17, 2013, 6 pages.
Sukharev, J. et al., "Correlation Study of Time-varying Multivariate Climate Data Sets," (Research Paper), Dec. 13, 2008, 8 pages.
Camps, O. et al., "PCA-based Object Recognition," Textbook: T&V Section 10.4, Dec. 11, 2015, 49 pages. <https://web.archive.org/web/20151211155016/http://www.cse.psu.edu/~rtc12/CSE486/lecture32.pdf>.

* cited by examiner

APPLICATION MANAGEMENT BASED ON DATA CORRELATIONS

CLAIM FOR PRIORITY

The present application is a national stage filing under 35 U.S.C. § 371 of PCT application number PCT/US2014/067067, having an international filing date of Nov. 24, 2014, the disclosure of which is hereby incorporated by reference in its entirety.

BACKGROUND

Many applications allow for dynamic, asynchronous data transfer, using multiple communication protocols and a variety of servers. Often, such applications gather data from distributed, heterogeneous sources. Clients having client-side functionality often also have server-side components, which may need additional processing before the server sends the data back to the client over a network. This separation of components over the network can cause latency that may affect the overall performance of an application that is executing on the network. Understanding the elements which contribute to this latency is important for developing and maintaining applications that must meet certain performance requirements.

DETAILED DESCRIPTION

Figure 1:
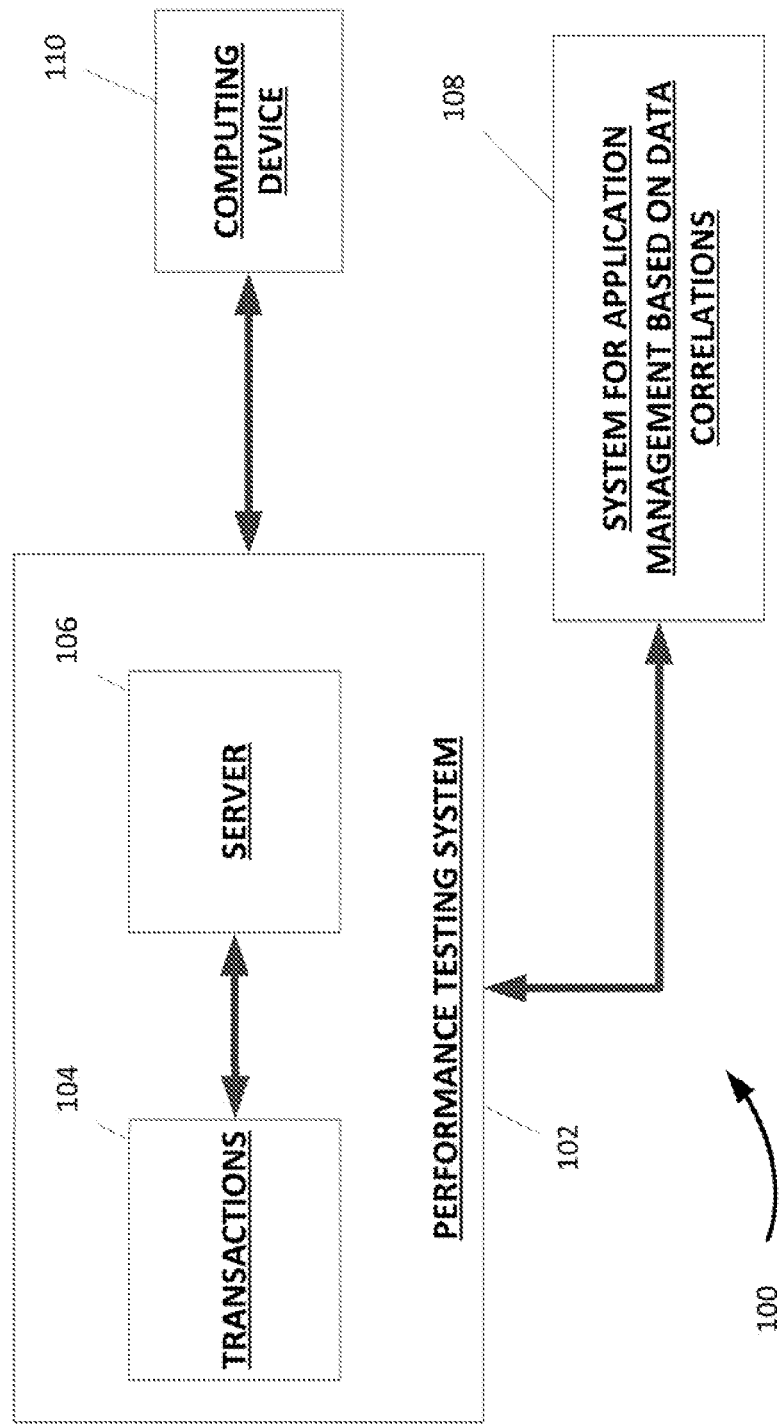
FIG. 1 is a functional block diagram illustrating one example of an environment for a system for application management based on data correlations.

Data correlation is a process of identifying quantitative interrelationships between transactional data elements. In a complex information system, several data components may generate transactional data elements. This separation of components over the network can cause latency that may affect the overall performance of an application that is executing on the network. In addition to performance issues caused by network latency, many application developers use new application technologies having features that enhance the interactivity of the user experience but at the cost of increasing network traffic. When compounded with network latency and bandwidth constraints, the large amounts of network traffic generated by these new technologies can create bottlenecks that can significantly impact system performance.

In such complex information systems, where several data sources may be involved, each generating its own data, there is often a need to find correlations in the data emerging from such data sources in order to gain insight about the system as a whole. Due to complexity of the data, latent relationships may exist that provide deeper insight into the system. Identifying such quantitative interrelationships between the generated transactional data elements may reveal interrelationships between the infrastructure components, thereby providing insight about the system as a whole.

In some examples, to accurately predict the performance of an application, the individual components of the application may be tested both during development and in a production environment. Generally, performance testing solutions may create synthetic transactions involving virtual users on an emulated network in order to predict application performance in production. For example, in an online shopping website, a transaction may be any user event, and test data may include, for example, a user identifier identifying a user, login response time indicative of time taken by the user to login at the online shopping website, and a transaction response time indicative of time taken by the user to complete a purchase transaction at the shopping website, a number of transactions completed in a second ("TPS"), and so forth. Test data may be generated for a plurality of users. A systems performance engineer may be interested in determining, for example, if there may be a correlation between the user, the user's login response time, and the user's transaction response time. In some examples, the systems performance engineer may be interested in a correlation between the user's login response time, and the user's transaction response time. Also, for example, a system may be tested under load for a variety of operations, and test data may indicate if the system passed or failed the test.

Generally, a correlation between two data components may be identified easily. However, identifying a correlation between three or more data components may be computationally difficult. For example, two data sources may provide transactional data elements $(x_1, x_2)$, such as, for example, (5, 1), (4, 2), (3, 3), and (2, 4). For example, $x_1$ may represent a user's login response time, and $x_2$ may represent the user's transaction response time. In this example, it may be determined that $(x_1, x_2)$ are correlated, and specifically that $x_1+x_2=6$ for every $x_1$ and $x_2$.

Data may be positively or negatively correlated. Positive correlation may be indicative of two data values that increase together, and negative correlation may be indicative of two data values where a first data value increases whereas a second data value decreases. For example, it may be determined that $(x_1, x_2)$ have high negative correlation, and specifically that $x_1+x_2=6$ for every $x_1$ and $x_2$.

In some examples, three data sources may provide test data based on an application under load testing, and a data element generator may generate a plurality of transactional data elements in a format such as $(x_1, x_2, x_3)$, for example, (2, 5, 2), (4, 1, 0), (3, 3, 1), (0, 8, 3), and (6, 2, 3). As in this example, there may not appear to be an evident relationship between any two components of the transactional data elements. However, the three components may be determined to be correlated as $x_1+x_2-x_3=5$. In other words, $x_3$ has a positive correlation with $x_1$ and $x_2$.

As described herein, eigen-decomposition of a covariance matrix may be utilized to identify highly correlated data components by identifying an eigenvector with a low variance, which in turn indicates high correlation between components of the eigenvector. The components of the eigenvector may be based on the data components of the plurality of transactional data elements, thereby revealing data correlations between the data components and/or data sources generating the plurality of transactional data elements. Generally, principle covariance analysis ("PCA") may be based on identifying correlations between vectors in a relevant vector space. As described herein, a covariance analysis may be utilized to identify correlations between basis vectors of the relevant vector space.

As described in various examples herein, application management based on data correlations is disclosed. One example is a system including a data processor, a data element generator, a matrix generator, a data analysis module, a performance module, and a load test manager. The data processor accesses test data based on an application under load testing. The data element generator generates a plurality of transactional data elements based on the test data, each data element comprising at least three data components. The matrix generator generates a covariance matrix based on the data components. The data analysis module determines an eigenvector associated with the covariance matrix, and identifies a correlation between a sub-plurality of the at least three data components based on coefficients of the eigenvector. The performance module determines, based on the correlation, performance metrics for the application under load testing. The load test manager manages, based on the performance metrics, the application under load testing.

In the following detailed description, reference is made to the accompanying drawings which form a part hereof, and in which is shown by way of illustration specific examples in which the disclosure may be practiced. It is to be understood that other examples may be utilized, and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

FIG. 1 is a functional block diagram illustrating one example of an environment 100 for a system 108 for application management based on data correlations. In some implementations, environment 100 may include a performance testing system 102. For example, performance testing system 102 may include a non-transitory machine-readable storage medium encoded with instructions which, when executed on a processor, may examine system behavior and performance while generating actual load. In some examples, performance testing system 102 may emulate hundreds or thousands of concurrent users and/or transactions 104 to collect information from infrastructure components. In some examples, performance testing system 102 may be configured to test both browser-based and native mobile applications based on a various network behaviors and service virtualizations. In some examples, performance testing system 102 may be configured to integrate performance testing, including continuous integration into a developing environment. In some examples, performance testing system 102 may identify application performance bottlenecks by using, for example, non-intrusive and/or real-time performance monitors that leverage application-layer and code-level data for root cause and analytics.

The system 108 for application management based on data correlations may include, invoke, execute, reference, or may be communicably coupled with the server 106 in performance testing system 102. The server 106 may include any software, hardware, and/or firmware configured to execute transactions 104 using the applications. For example, the server 106 may be a computing system that executes transactions 104 from thousands of users. In this example, the server 106 may support hundreds or thousands of users simultaneously. In some examples, the system 108 to determine application performance metrics based on data correlations may provide the application performance metrics to a computing device 110 for correction of bottlenecks, balancing of network traffic, and/or performance of other system management tasks to enhance application efficiency.

Figure 2:
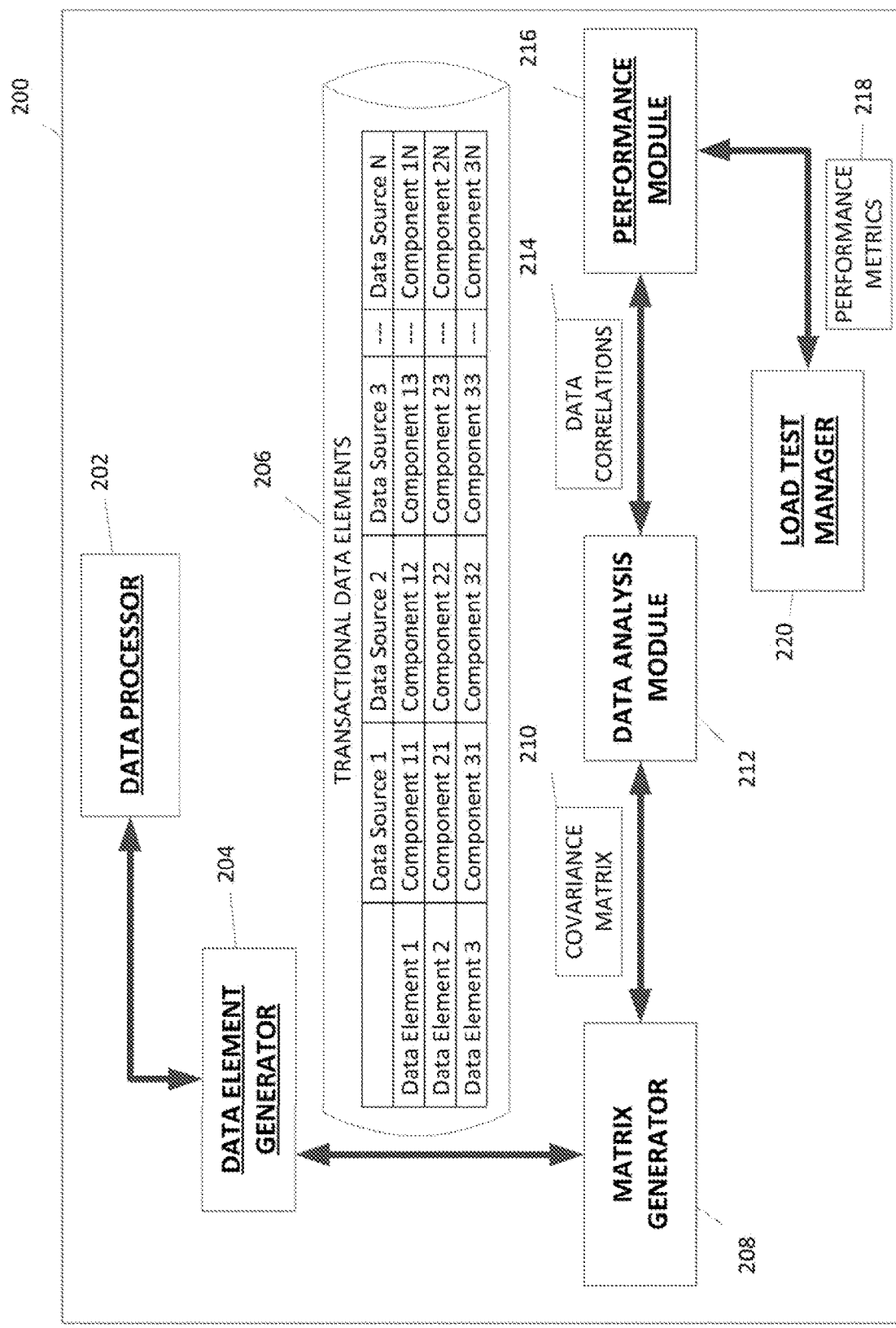
FIG. 2 is a functional block diagram illustrating one example of a system for application management based on data correlations.

FIG. 2 is a functional block diagram illustrating one example of a system 200 for application management based on data correlations. In some examples, the system 200 is the system 108 for application management based on data correlations described with reference to FIG. 1. The term "system" may be used to refer to a single computing device or multiple computing devices that communicate with each other (e.g. via a network) and operate together to provide a unified service. The components of system 200 may communicate with one another over a network (represented by the bi-directional arrows in FIG. 2). As described herein, the network may be any wired or wireless network, and may include any number of hubs, routers, switches, cell towers, and so forth. Such a network may be, for example, part of a cellular network, part of the internet, part of an intranet, and/or any other type of network.

System 200 may access test data based on an application under load testing. The system 200 may generate a plurality of transactional data elements based on the test data, each data element comprising at least three data components, and may generate a covariance matrix based on the at least three data components. The system 200 may determine an eigenvector associated with a lowest eigenvalue of the covariance matrix, and may identify a correlation between a sub-plurality of the at least three data components based on coefficients of the eigenvector. System 200 may determine, based on the correlation, performance metrics for the application under load testing.

System 200 may include a load test manager 202, a data processor 204, a data analysis module 212, and a performance module 216. In some examples, the components of system 200 may be implemented as machine readable instructions stored on a machine-readable storage medium. The machine readable storage medium storing such instructions may be integrated with the system 200, or it may be an external medium that may be accessible to the system 200.

Data processor 202 may include a non-transitory computer-readable storage medium including instructions that, when executed by a processor, access test data based on an application under load testing. Load testing may be a process by which an application (e.g., software application) is tested under a simulated stress (or load). Typically, applications may be tested in a fashion similar to the manner that the application will be used in the operating environment of the customers. Hence, a test engineer tries to understand how a human user would use the application, and then devises a method on how the human usage may be automated through the use of an application testing or network monitoring tool, such as performance testing system 102 in FIG. 1. In such configurations, the application developer or tester may provide a number of test network transactions and other traffic that mimic real world situations. A load test may include concurrent execution of multiple scripts to evaluate the performance of a computer program.

The test data may be provided to a data element generator 204 for processing. In some examples, data processor 202 may include a non-transitory computer-readable storage medium including instructions that, when executed by a processor, provide the test data to the data element generator 204. In some examples, data element generator 204 may include a non-transitory computer-readable storage medium including instructions that, when executed by a processor, receive the test data from the data processor 202. In some examples, data element generator 204 may include a non-transitory computer-readable storage medium including instructions that, when executed by a processor, generate a plurality of transactional data elements 206 based on the test data, each transactional data element 206 comprising at least three data components. In some examples, the at least three data components may be received from at least three data sources. In some examples, the test data may be received as structured data comprising transactional data elements 206 with at least three data components. In such instances, data processor 202 and data element generator 204 may be merged into one component of system 200.

In some examples, data processor 204 may generate the plurality of transactional data elements 206 from raw and/or unstructured test data. As illustrated, Data Element 1 may comprise Component 11 from Data Source 1, Component 12 from Data Source 2, Component 13 from Data Source 3, and so forth till Component 1N from Data Source N. Similarly, Data Element 2 may comprise Component 21 from Data Source 1, Component 22 from Data Source 2, Component 23 from Data Source 3, and so forth till Component 2N from Data Source N. In some examples, Data Element 1 may be a vector such as (Component 11, Component 12, ... , Component 1N). In some examples, Data Element 2 may be a vector such as (Component 21, Component 22, ... , Component 2N). In some examples, the at least three data components may be numeric data. In some examples, the at least three data components may be non-numeric data, and may be converted to numeric data.

In some examples, data element generator 204 may include a non-transitory computer-readable storage medium including instructions that, when executed by a processor, provide the transactional data elements 206 to the matrix generator 208. In some examples, matrix generator 208 may include a non-transitory computer-readable storage medium including instructions that, when executed by a processor, receive the transactional data elements 206 from the data element generator 204. In some examples, matrix generator 208 may include a non-transitory computer-readable storage medium including instructions that, when executed by a processor, generate a covariance matrix 210 based on the at least three data components. The covariance matrix 210 may be a matrix where the $ij^{th}$ element is indicative of the covariance between the random variable which is the $i^{th}$ component of the Data Elements, and the random variable which is the $j^{th}$ component of the Data Elements. Generally, the covariance matrix 210 may not be dependent on the number of points, but only on the number of dimensions. Covariance measures how much the plurality of transactional data elements change with respect to one another.

In some examples, the transactional data elements 206 may be vectors such as $X=(x_1, x_2, \ldots, x_N)$, and $Y=(y_1, y_2, \ldots, y_N)$. A covariance matrix 210 for X and Y may be determined as C, where the $ij^{th}$ element of matrix C is:

$$C_{ij}=\text{cov}(x_i, y_j).$$

In some examples, matrix generator 208 may include a non-transitory computer-readable storage medium including instructions that, when executed by a processor, provide the covariance matrix 210 to the data analysis module 212. In some examples, data analysis module 212 may include a non-transitory computer-readable storage medium including instructions that, when executed by a processor, receive the covariance matrix 210 from the matrix generator 208. In some examples, data analysis module 212 may include a non-transitory computer-readable storage medium including instructions that, when executed by a processor, determine an eigenvector associated with a lowest eigenvalue of the covariance matrix. In some examples, the eigenvectors form a basis for the same vector space that may include the vectors X and Y. Generally, in principal component analysis, or eigenvalue decomposition, eigenvectors with high eigenvalue have large variance, and hence low correlation between the vector components; eigenvectors with low eigenvalue have small variance, and hence high correlation between the vector components. In some examples, the data analysis module 212 may rank the eigenvectors based on eigenvalues of the covariance matrix.

Data analysis module 212 may identify a correlation between a sub-plurality of the at least three data components based on coefficients of the eigenvector. In some implementations, data analysis module 212 may include a non-transitory computer-readable storage medium including instructions that, when executed by a processor, identify the correlation. For example, the standard basis vectors in the Euclidean space $R^N$ may be represented as $e_1=(1, 0, 0, \ldots, 0)$, $e_2=(0, 1, 0, \ldots, 0)$, ..., $e_N=(0, 0, 0, \ldots, 1)$. The eigenvectors of the covariance matrix C may be represented as $v_1, v_2, \ldots, v_N$. Accordingly, each $v_i$ may be represented as a linear combination of the standard basis vector:

$$v_i = \Sigma_{j=1}^N a_j e_j$$

where each $a_j$ is a real number. As described herein, in some examples, the eigenvectors may be ranked in increasing order based on the associated eigenvalues.

In some examples, the eigenvalues may be represented as $\mu_1, \mu_2, \ldots, \mu_N$, and may be arranged in increasing order of their values. In some examples, the lowest eigenvalue $\mu_1=0.01$, with corresponding eigenvector $v_1$. Also, for example, the sum of all eigenvalues may be 10, i.e., $$\mu_1+\mu_2+ \ldots +\mu_N=10.$$

In some examples, the lowest eigenvalue has a lowest spectral energy. In some examples, a spectral energy may be associated with the eigenvalue and/or eigenvector. The spectral energy for eigenvalue $\mu_i$ associated with eigenvector $v_i$ may be determined as:

$$\frac{\mu_i}{\mu_1 + \mu_2 + \ldots + \mu_N}$$

In some examples, the spectral energy of the lowest eigenvalue $\mu_1=0.01$, with corresponding eigenvector $v_1$ may be determined as $0.01/10=0.001$, where $\mu_1+\mu_2+ \ldots +\mu_N=10$. In terms of information stored, when the two transactional data elements are represented in terms of the eigenvectors $v_1, v_2, \ldots, v_N$, the value of their first coordinate projected along the direction of $v_1$ holds $0.01/10=0.001$ of the information. Accordingly, the first coordinate may be determined to have very low covariance.

As described herein, the eigenvector $v_1$ may be represented as a linear combination of the standard basis vectors. In some examples, $v_1=e_1+e_2-e_3$. Accordingly, for the transactional data elements 206 represented as $(x_1, x_2, x_3)$, the data analysis module 212 may identify the correlation between $x_1$, $x_2$, and $x_3$; in particular, that $x_1$, $x_2$, and $x_3$ are highly correlated, and that $x_3$ and $x_1+x_2$ are dependent. In some examples, the data analysis module 212 may identify a correlation between the respective at least three data sources. For example, the data analysis module 212 may identify that Data Source 1, Data Source 2, and Data Source 3 are highly correlated.

In some examples, data correlations 214 may be identified for a sub-collection of the eigenvectors $v_1, v_2, \ldots, v_N$. For example, the plurality of transactional data elements 206 may comprise ten data components $(x_1, x_2, \ldots, x_{10})$, and it may be determined that the eigenvector $v_1$ associated with the lowest eigenvalue satisfies $v_1 = e_3 + e_5 - e_8$, thereby providing data correlations 214 between the data components $x_3$, $x_5$, and $x_8$. Accordingly, it may be determined that of the ten data sources, Data Source 3, Data Source 5, and Data Source 8 are correlated.

In some examples, the data analysis module 212 may identify the eigenvector having the lowest eigenvalue when the lowest eigenvalue is below a threshold value. For example, if the threshold value is set to 0.0001, then the data analysis module 212 may determine that the data sources are not correlated, based at least in part on the determination that the lowest spectral energy is 0.001, which is not below the threshold value of 0.0001. On the other hand, if the threshold value is set to 0.01, then the data analysis module 212 may determine that the data sources are correlated, based at least in part on the determination that the lowest spectral energy is 0.001, which is below the threshold value of 0.01.

Data correlations 214 may be provided to the performance module 216 by the data analysis module 212. In some examples, data analysis module 212 may include a non-transitory computer-readable storage medium including instructions that, when executed by a processor, provide the data correlations 214 to the performance module 216. In some examples, performance module 216 may include a non-transitory computer-readable storage medium including instructions that, when executed by a processor, receive the data correlations 214 from the data analysis module 212. In some examples, performance module 216 may include a non-transitory computer-readable storage medium including instructions that, when executed by a processor, determine, based on the correlation, performance metrics 218 for the application under load testing.

In some examples, the performance metrics 218 for the application under load testing may include system capability for network traffic from the sub-at least three data sources. In some examples, a system may be tested under load of various operations (or transactions). Transactional information may be accessed, including, for example, transaction and/or response time, if the transaction passed or failed, number of transactions completed in a second, and so forth. In some examples, for three transactions $T_1$, $T_2$, and $T_3$, system 200 may generate a vector for the number of transactions per second ("TPS"), for example, ($T_1\_TPS, T_2\_TPS, T_3\_TPS$), and the data analysis module 212 may identify data correlations 214 such as $T_1\_TPS + T_2\_TPS + T_3\_TPS = 1000$. Based on the data correlations 214, performance module 216 may determine performance metrics 218 for the application under load testing, such as, for example, system capability for network traffic from data sources generating the operations.

In some examples, the performance metrics 218 for the application under load testing may include a potential bottleneck for the network traffic, and the performance module 216 may detect the potential bottleneck for the network traffic based on the system capability. In some examples, the bottleneck may be an internet bottleneck, where high usage may impede the speed on the internet at a particular point. In some examples, the bottleneck may be a software component that may severely affect application performance.

In some examples, the performance metrics 218 for the application under load testing may include an incorrect locking, and the performance module 216 may detect an incorrect locking based on the system capability. For example, if $T_1$, $T_2$, and $T_3$ together lock an entire database, then a greater number of transactions per second of transaction type $T_1$ may be indicative of a lower number of transactions per second of transaction types $T_2$, and $T_3$.

In some examples, the transactional data elements 206 may be represented as $(x_1, x_2, x_3)$, where data component $x_1$ indicates response time of a user login, data component $x_2$ indicates a number of order acquisitions, and data component $x_3$ indicates number of cancellations. The plurality of transactional data elements may be (2, 5, 2), (4, 1, 0), (3, 3, 1), (0, 8, 3), and (6, 2, 3). Based on these transactional data elements, a covariance matrix 210 may be described as:

$$C = \begin{pmatrix} 5 & -5.5 & -0.5 \\ -5.5 & 7.7 & 2.2 \\ -0.5 & 2.2 & 1.7 \end{pmatrix}$$

A spectral decomposition for this covariance matrix is illustrated in Table 1. As indicated, the eigenvector $v_1$ with the lowest eigenvalue $\mu_1 = 0$ may be expressed in terms of $x_1$, $x_2$, and $x_3$ as follows:

$$v_1 = -0.577x_1 - 0.577x_2 + 0.577x_3$$

TABLE 1

Spectral Decomposition of the Covariance Matrix C

| Eigenvector | Eigenvalue | Coefficient 1 | Coefficient 2 | Coefficient 3 |
|---|---|---|---|---|
| $v_1$ | 0 | −0.577 | −0.577 | 0.577 |
| $v_2$ | 1.995 | 0.56 | 0.234 | 0.794 |
| $v_3$ | 12.405 | −0.594 | 0.782 | 0.188 |

Accordingly, data analysis module 212 may determine that $x_1 + x_2 - x_3$ has a high correlation.

As in the above-mentioned example, the data analysis module 212 may determine that $x_1 + x_2 - x_3$ has a high correlation. In some examples, such data correlations 214 may be received by the performance module 216. The data correlations 214 may be indicative of an incorrect and/or redundant locking being performed in a database between the seemingly independent operations, tables, and/or data that may be representative of response time of a user login, number of order acquisitions, and number of cancellations. Such information may be determined, for example, as performance metrics 218 for the database.

Performance metrics 218 may be provided to the load test manager 220 by the performance module 216. In some examples, performance module 216 may include a non-transitory computer-readable storage medium including instructions that, when executed by a processor, provide the performance metrics 218 to the load test manager 220. In some examples, load test manager 220 may include a non-transitory computer-readable storage medium including instructions that, when executed by a processor, receive the performance metrics 218 from the performance module 216. In some examples, load test manager 220 may include a non-transitory computer-readable storage medium including instructions that, when executed by a processor, manage, based on the performance metrics 218, the application under load testing.

In some examples, where the performance metrics 218 are indicative of an incorrect and/or redundant locking being performed in a database between the seemingly independent operations, tables, and/or data that may be representative of response time of a user login, number of order acquisitions, and number of cancellations, the load test manager 220 may redesign a system and/or database that supports the seemingly independent operations, tables, and/or data.

In some examples, where the performance metrics 218 are indicative of a potential bottleneck for the network traffic, the load test manager 220 may manage network traffic to avert the potential bottleneck. In examples where the bottleneck is an internet bottleneck, where high usage may impede the speed on the internet at a particular point, the load test manager 220 may manage network traffic at and/or proximate to the particular point. In some examples where the bottleneck is a software component that may severely affect application performance, the load test manager 220 may modify the timing and/or implementation of the software component.

In some examples, where the performance metrics 218 are indicative of an incorrect locking, the load test manager 220 may correct the incorrect locking. For example, if $T_1$, $T_2$, and $T_3$ together lock an entire database, then a greater number of transactions per second of transaction type $T_1$ may be indicative of a lower number of transactions per second of transaction types $T_2$, and $T_3$. Accordingly, load test manager 220 may balance the number of transactions per second by redistributing them to avoid the incorrect locking.

In some examples, the load test manager 220 may trigger a system alert based on the system capability. For example, upon a determination that of ten data sources, Data Source 3, Data Source 5, and Data Source 8 are correlated, the performance module 216 may trigger a system alert that Data Source 3, Data Source 5, and Data Source 8 are correlated. As described herein, the performance module 216 may identify if the sub-plurality of the at least three data sources are correlated. In some examples, the performance module 216 may identify if the sub-plurality of the at least three data sources are positively correlated or negatively correlated. For example, upon receipt of performance metrics 218 indicative of system capability for network traffic, the load test manager 220 may trigger an alert for a performance engineer that the system cannot handle more than 1000 transactions per second of type $T_1$, $T_2$, and $T_3$. If $T_1$, $T_2$, and $T_3$, are unrelated (or independent) operations, then an inability to handle more than 1000 transactions per second may be indicative of a problem with the system, and the load test manager 220 may trigger another alert for the performance engineer.

In some examples, the load test manager 220 may include a non-transitory computer-readable storage medium including instructions that, when executed by a processor, provide such application management information to the performance testing system 102 illustrated in FIG. 1. For example, the load test manager 220 may include a non-transitory computer-readable storage medium including instructions that, when executed by a processor, trigger a system alert based on the performance metrics 218 for the application, and such a system alert may be triggered via the performance testing system 102 illustrated in FIG. 1. In some examples, the load test manager 220 may include a non-transitory computer-readable storage medium including instructions that, when executed by a processor, perform the load testing on the application.

Figure 3:
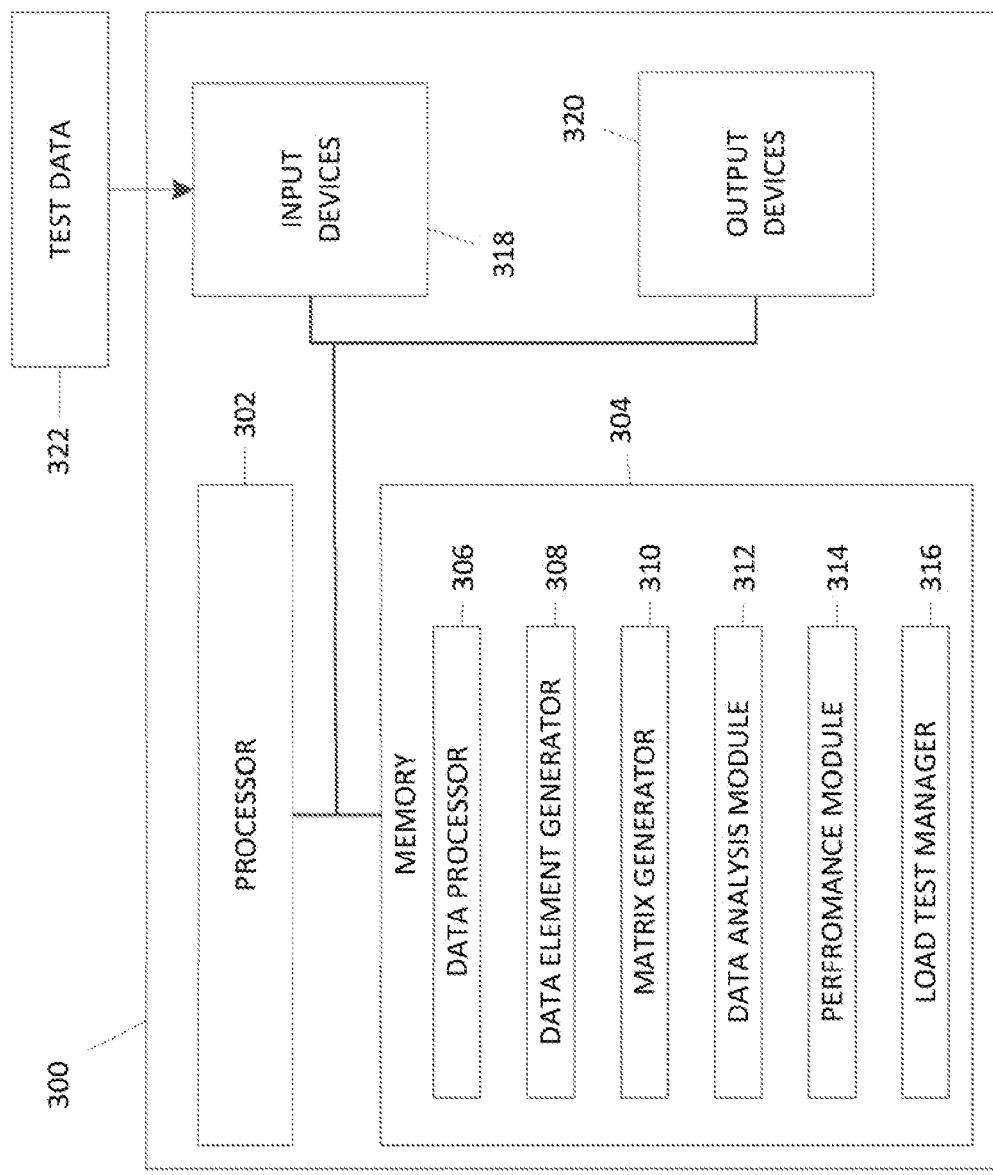
FIG. 3 is a block diagram illustrating one example of a processing system for implementing the system for application management based on data correlations.

FIG. 3 is a block diagram illustrating one example of a processing system 300 for implementing the system 200 for application management based on data correlations. Processing system 300 may include a processor 302, a memory 304, input devices 318, and output devices 320. Processor 302, memory 304, input devices 318, and output devices 320 are coupled to each other through communication link (e.g., a bus).

Processor 302 may include a Central Processing Unit (CPU) or another suitable processor. In some examples, memory 304 stores machine readable instructions executed by processor 302 for operating processing system 300. Memory 304 may include any suitable combination of volatile and/or non-volatile memory, such as combinations of Random Access Memory (RAM), Read-Only Memory (ROM), flash memory, and/or other suitable memory.

Memory 304 stores instructions to be executed by processor 302 including instructions for a data processor 306, a data element generator 308, a matrix generator 310, a data analysis module 312, a performance module 314, and a load test manager 316. In some examples, data processor 306, data element generator 308, matrix generator 310, data analysis module 312, performance module 314, and load test manager 316 include data processor 202, data element generator 204, matrix generator 208, data analysis module 212, performance module 216, and load test manager 220 respectively, as previously described and illustrated with reference to FIG. 2.

In some examples, processor 302 executes instructions of data processor 306 to access test data 322 based on an application under load testing. In some examples, processor 302 executes instructions of a data element generator 308 to generate a plurality of transactional data elements based on the test data 322, each data element comprising at least three data components. In some examples, each transactional data element may be a vector with components from the at least three data sources.

In some examples, processor 302 executes instructions of matrix generator 310 to generate a covariance matrix based on the at least three data components. Processor 302 executes instructions of a data analysis module 312 to determine an eigenvector associated with a lowest eigenvalue of the covariance matrix, and to identify a correlation between a sub-plurality of the at least three data components based on coefficients of the eigenvector. In some examples, processor 302 executes instructions of the data analysis module 312 to rank the eigenvectors based on eigenvalues of the covariance matrix.

In some examples, processor 302 executes instructions of c the data analysis module 312 to identify the correlation between the at least three data sources by identifying an eigenvector having a lowest spectral energy. In some examples, processor 302 executes instructions of the data analysis module 312 to identify the eigenvector having the lowest eigenvalue when the lowest spectral energy is below a threshold value. In some examples, processor 302 executes instructions of the data analysis module 312 to identify if the sub-plurality of the at least three data sources are positively correlated.

In some examples, processor 302 executes instructions of a performance module 314 to determine, based on the correlation, performance metrics for the application under load testing. In some examples, performance metrics for the application under load testing include system capability for network traffic from the sub-at least three data sources. In some examples, processor 302 executes instructions of a performance module 314 to detect a potential bottleneck for the network traffic based on the system capability. In some examples, processor 302 executes instructions of a performance module 314 to detect an incorrect locking based on the system capability.

In some examples, processor 302 executes instructions of a load test manager 220 to manage, based on the performance metrics, the application under load testing. In some examples, processor 302 executes instructions of a load test manager 220 to trigger a system alert based on the performance metrics for the application. In some examples, processor 302 executes instructions of a load test manager 220 to perform the load testing on the application.

Input devices 318 include a keyboard, mouse, data ports, and/or other suitable devices for inputting information into processing system 300. In some examples, input devices 318 are used to access test data 322. Output devices 320 include a monitor, speakers, data ports, and/or other suitable devices for outputting information from processing system 300. In some examples, output devices 320 are used to output performance metrics for the application under load testing.

Figure 4:
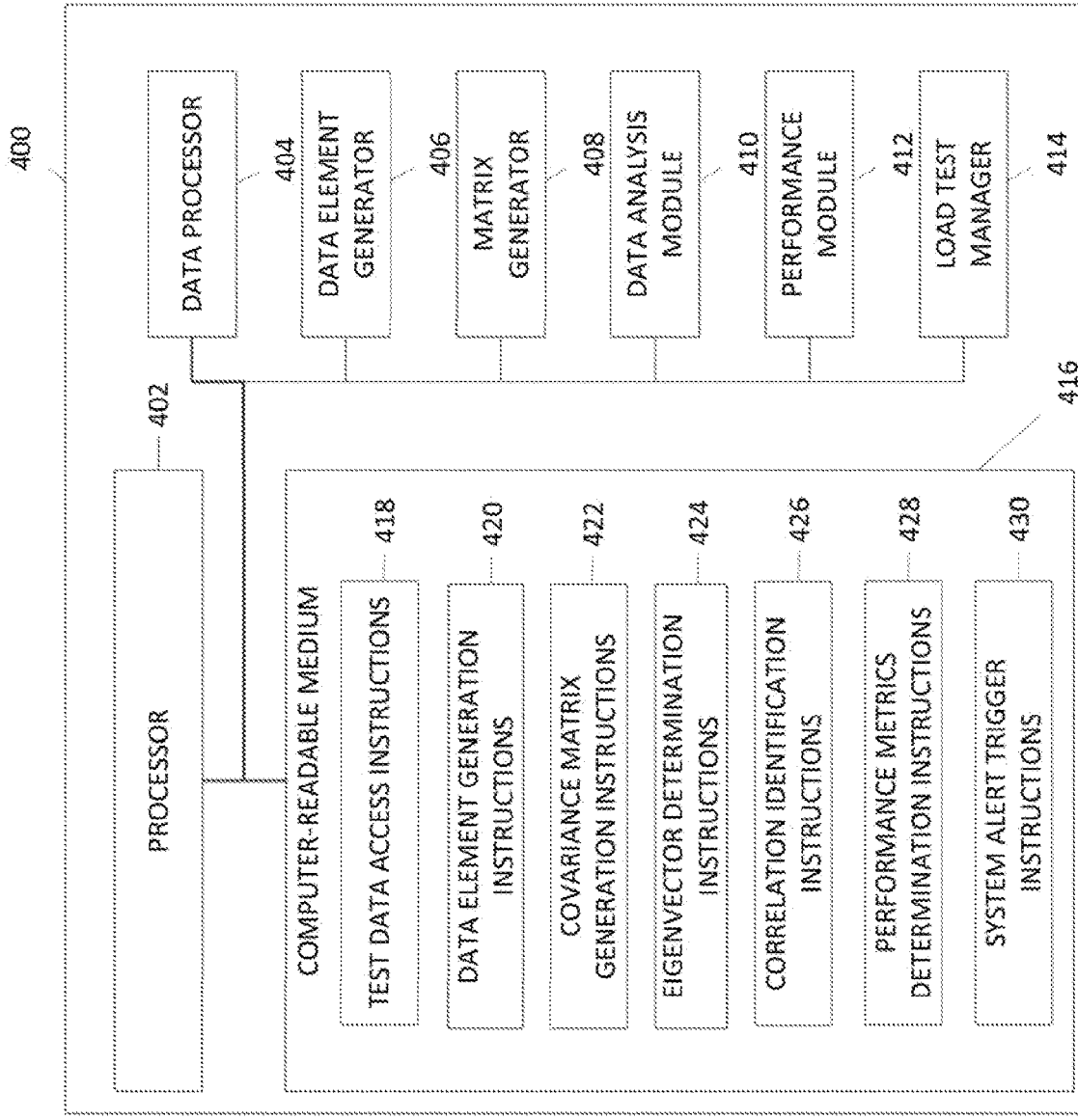
FIG. 4 is a block diagram illustrating one example of a computer readable medium for application management based on data correlations.

FIG. 4 is a block diagram illustrating one example of a computer readable medium for application management based on data correlations. Processing system 400 may include a processor 402, a computer readable medium 416, a load test manager 404, a data processor 406, a correlation identifier 408, and an application performance monitor 410. Processor 402, computer readable medium 416, load test manager 404, data processor 406, correlation identifier 408, and application performance monitor 410 are coupled to each other through communication link (e.g., a bus).

Processor 402 executes instructions included in the computer readable medium 416. Computer readable medium 416 may include test data access instructions 418 of the data processor 404 to access test data based on an application under load testing.

Computer readable medium 416 may include data element generation instructions 420 of a data element generator 406 to generate a plurality of transactional data elements based on the test data, each data element comprising at least three data components.

Computer readable medium 416 may include covariance matrix generation instructions 422 of a matrix generator 408 to generate a covariance matrix based on the at least three data components.

Computer readable medium 416 may include eigenvector determination instructions 424 of a data analysis module 410 to determine an eigenvector associated with a lowest eigenvalue of the covariance matrix. In some examples, computer readable medium 416 may include instructions of a data analysis module 410 to determine the lowest eigenvalue based on a threshold value.

Computer readable medium 416 may include correlation identification instructions 426 of the data analysis module 410 to identify a correlation between a sub-plurality of the at least three data components based on coefficients of the eigenvector. In some examples, computer readable medium 416 may include correlation identification instructions 426 of the data analysis module 410 to identify if the sub-plurality of the at least three data components are positively correlated.

Computer readable medium 416 may include performance metrics determination instructions 428 of a performance module 412 to determine, based on the correlation, performance metrics for the application under load testing. In some examples, computer readable medium 416 may include instructions of a performance module 412 to detect, based on the performance metrics, at least one of a potential bottleneck and an incorrect locking for the application under load testing.

Computer readable medium 416 may include system alert trigger instructions 430 of a load test manager 414 to trigger, via the processor 402, a system alert based on the performance metrics for the application. In some examples, computer readable medium 416 may include instructions of a load test manager 414 to manage, based on the performance metrics, the application under load testing. In some examples, computer readable medium 416 may include instructions of a load test manager 414 to perform the load testing on the application.

As used herein, a "computer readable medium" may be any electronic, magnetic, optical, or other physical storage apparatus to contain or store information such as executable instructions, data, and the like. For example, any computer readable storage medium described herein may be any of Random Access Memory (RAM), volatile memory, non-volatile memory, flash memory, a storage drive (e.g., a hard drive), a solid state drive, and the like, or a combination thereof. For example, the computer readable medium 416 can include one of or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

As described herein, various components of the processing system 400 are identified and refer to a combination of hardware and programming configured to perform a designated function. As illustrated in FIG. 4, the programming may be processor executable instructions stored on tangible computer readable medium 416, and the hardware may include processor 402 for executing those instructions. Thus, computer readable medium 416 may store program instructions that, when executed by processor 402, implement the various components of the processing system 400.

Such computer readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

Computer readable medium 416 may be any of a number of memory components capable of storing instructions that can be executed by processor 402. Computer readable medium 416 may be non-transitory in the sense that it does not encompass a transitory signal but instead is made up of one or more memory components configured to store the relevant instructions. Computer readable medium 416 may be implemented in a single device or distributed across devices. Likewise, processor 402 represents any number of processors capable of executing instructions stored by computer readable medium 416. Processor 402 may be integrated in a single device or distributed across devices. Further, computer readable medium 416 may be fully or partially integrated in the same device as processor 402 (as illustrated), or it may be separate but accessible to that device and processor 402. In some examples, computer readable medium 416 may be a machine-readable storage medium.

Figure 5:
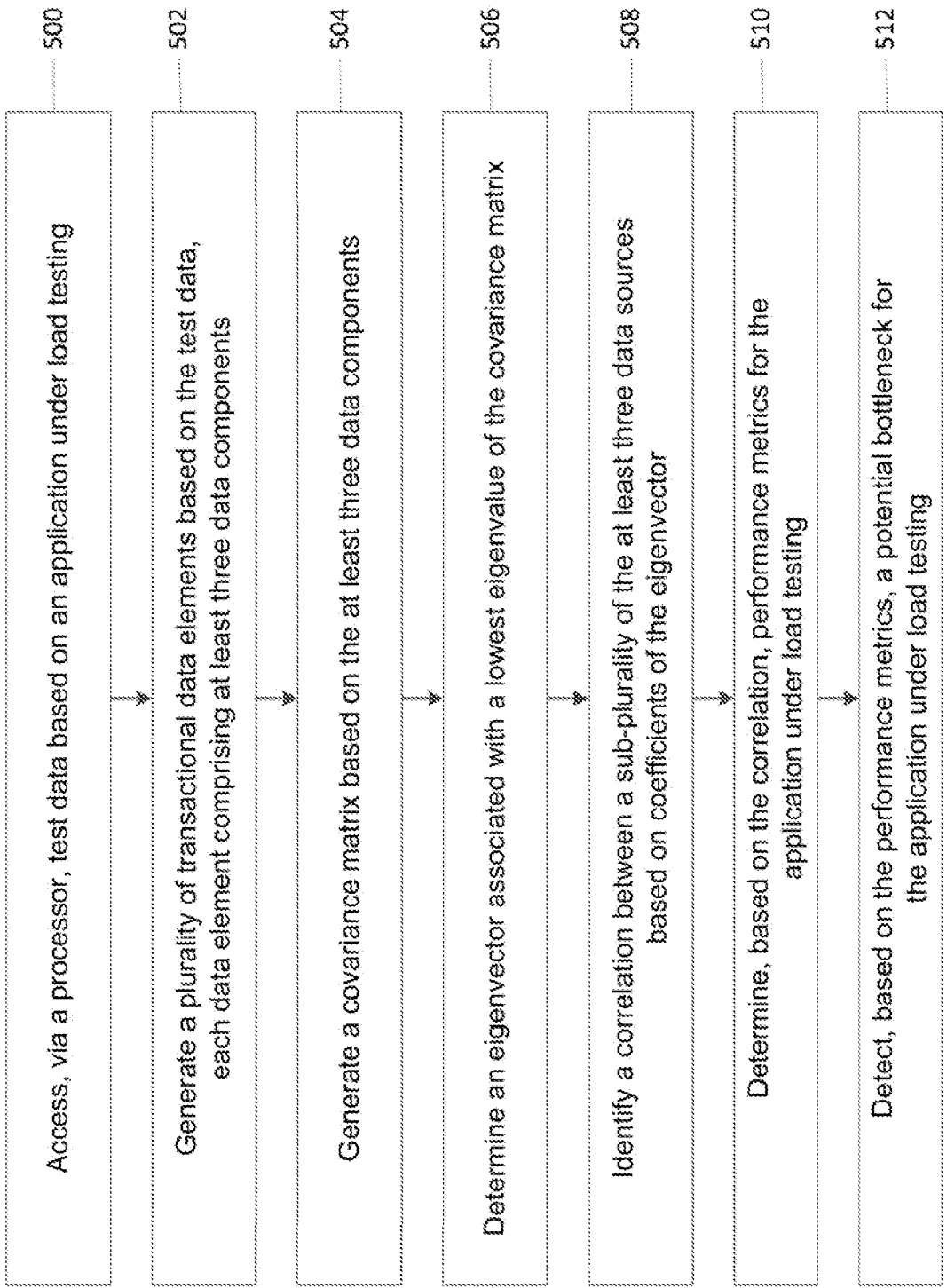
FIG. 5 is a flow diagram illustrating one example of a method for application management based on data correlations.

FIG. 5 is a flow diagram illustrating one example of a method for application management based on data correlations. At 500, test data based on an application under load testing may be accessed via a processor. At 502, a plurality of transactional data elements may be generated based on the test data, each data element comprising at least three data components. At 504, a covariance matrix may generated based on the at least three data components. At 506, an eigenvector associated with a lowest eigenvalue of the covariance matrix may be determined. At 508, a correlation between a sub-plurality of the at least three data sources may be identified based on coefficients of the eigenvector. At 510, based on the correlation, performance metrics for the application under load testing may be determined. At 512, based on the performance metrics, a potential bottleneck for the application under load testing may be detected.

In some examples, the method further may include triggering, via the processor, a system alert based on the performance metrics for the application.

In some examples, the method further may include detecting, based on the performance metrics, an incorrect locking for the application under load testing.

In some examples, the lowest eigenvalue has a lowest spectral energy.

In some examples, the lowest eigenvalue is below a threshold value.

Examples of the disclosure provide a generalized system for application management based on data correlations. The generalized system may provide an automatable approach to discovering complex correlations between three or more components based on an eigen-decomposition of a covariance matrix. System capability may be determined based on the data correlations, and appropriate application management functions may be implemented.

Although specific examples have been illustrated and described herein, the examples illustrate applications to any structured data. Accordingly, there may be a variety of alternate and/or equivalent implementations that may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A system comprising:
a processor; and
a memory storing instructions executable by the processor to cause the processor to:
access test data based on an application under load testing;
generator to generate a plurality of transactional data elements based on the test data, each transactional data element comprising three data components received from three data sources;
generate a covariance matrix based on the three data components of each of the transactional data elements;
determine an eigenvector associated with a lowest eigenvalue of the covariance matrix;
identify a correlation between the three data components based on coefficients of the eigenvector associated with the lowest eigenvalue of the covariance matrix;
determine, based on the correlation, performance metrics for the application under load testing;
manage, based on the performance metrics, the application under load testing; and
trigger a system alert based on the performance metrics of the application.

2. The system of claim 1, wherein the instructions are executable to cause the processor to detect, based on the performance metrics, at least one of a potential bottleneck and an incorrect locking for the application under load testing.

3. The system of claim 1, wherein the lowest eigenvalue has a lowest spectral energy.

4. The system of claim 1, wherein the lowest eigenvalue is below a threshold value.

5. The system of claim 3, wherein the spectral energy of each eigenvalue is determined based on a ratio of the eigenvalue over a sum of all eigenvalues.

6. The system of claim 1, wherein the instructions are executable to cause the processor to determine whether the three data components are positively correlated.

7. The system of claim 1, wherein the instructions are executable to cause the processor to perform the load testing on the application.

8. A method for application management based on data correlations, the method comprising:
accessing, via a processor, test data based on an application under load testing;
generating a plurality of transactional data elements based on the test data, each data element comprising three data components received from three data sources;
generating a covariance matrix based on the three data components of each of the transactional data elements;
determining an eigenvector associated with a lowest eigenvalue of the covariance matrix;
identifying a correlation between the three data components based on coefficients of the eigenvector associated with the lowest eigenvalue of the covariance matrix;
determining, based on the correlation, performance metrics for the application under load testing; and
detecting, based on the performance metrics, a potential bottleneck for the application under load testing.

9. The method of claim 8, further comprising triggering, via the processor, a system alert based on the performance metrics for the application.

10. The method of claim 8, further comprising detecting, based on the performance metrics, an incorrect locking for the application under load testing.

11. The method of claim 8, wherein the lowest eigenvalue has a lowest spectral energy.

12. The method of claim 11, further comprising: determining the spectral energy of each eigenvalue based on a ratio of the eigenvalue over a sum of all eigenvalues.

13. The method of claim 8, wherein the lowest eigenvalue is below a threshold value.

14. A non-transitory computer readable medium comprising executable instructions to:
access, via a processor, test data based on an application under load testing;
generate a plurality of transactional data elements based on the test data, each data element comprising three data components received from three data sources;
generate a covariance matrix based on the three data components of each of the transactional data elements;
determine an eigenvector associated with a lowest eigenvalue of the covariance matrix;

identify a correlation between the three data components based on coefficients of the eigenvector associated with the lowest eigenvalue of the covariance matrix;

determine, based on the correlation, performance metrics for the application under load testing; and trigger, via the processor, a system alert based on the performance metrics for the application.

15. The non-transitory computer readable medium of claim 14, further comprising instructions to detect, based on the performance metrics, at least one of a potential bottleneck and an incorrect locking for the application under load testing.

16. The non-transitory computer readable medium of claim 14, wherein the lowest eigenvalue is below a threshold value.

17. The non-transitory computer readable medium of claim 14, wherein the lowest eigenvalue has a lowest spectral energy.

18. The non-transitory computer readable medium of claim 17, wherein the spectral energy of each eigenvalue is determined based on a ratio of the eigenvalue over a sum of all eigenvalues.

* * * * *